（12） United States Patent
Cristallo et al.

(10) Patent No.: US 8,990,880 B2
(45) Date of Patent: Mar. 24, 2015

(54) METHOD, APPARATUS, AND SERVER FOR SPREADING FILE TRANSFER NOTIFICATIONS IN TIME

(75) Inventors: Geoffrey Cristallo, Forest (BE); Piet Vandaele, Sint-Amandsberg (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/499,231

(22) PCT Filed: Oct. 15, 2010

(86) PCT No.: PCT/EP2010/065510
§ 371 (c)(1),
(2), (4) Date: Apr. 27, 2012

(87) PCT Pub. No.: WO2011/051111
PCT Pub. Date: May 5, 2011

(65) Prior Publication Data
US 2012/0216238 A1    Aug. 23, 2012

(30) Foreign Application Priority Data
Oct. 27, 2009    (EP) ..................................... 09306020

(51) Int. Cl.
*H04N 7/173*    (2011.01)
*H04N 7/16*    (2011.01)
(Continued)

(52) U.S. Cl.
CPC .......... *H04L 41/082* (2013.01); *H04N 7/17318* (2013.01); *H04N 21/435* (2013.01);
(Continued)

(58) Field of Classification Search
CPC ............ H04N 7/17318; H04N 21/435; H04N 21/8166; G06F 3/0481; G06F 9/4443; G06F 8/65; G06F 8/67; G06F 8/61; G06F 9/4411; H04L 29/08072; H04L 29/06; H04L 29/08981
USPC .......... 725/132, 152, 116, 140, 146; 715/748, 715/749; 717/171, 173, 176, 178; 709/235, 709/244, 223, 224, 232
See application file for complete search history.

(56) References Cited

U.S. PATENT DOCUMENTS 6,760,760 B1 * 7/2004 McGrane ....................... 709/219
7,222,186 B2 * 5/2007 Kobayashi ..................... 709/235
(Continued)

FOREIGN PATENT DOCUMENTS

JP    4023525 A    1/1992
JP    2005190412 A    7/2005
(Continued)

OTHER PUBLICATIONS

"TR-069 CPE WAN Management Protocol v1.1, Issue 1 Amendment 2" Broadband Forum Technical Report, No. 1 amendment 2, Dec. 1, 2007, pp. 1-138; XP002493850.
(Continued)

*Primary Examiner* — Hoang-Vu A Nguyen-Ba
(74) *Attorney, Agent, or Firm* — Harness, Dickey & Pierce

(57) ABSTRACT

The present invention relates to home devices such as set-top boxes, and more particularly to methods providing autonomous file transfers to and from such home devices. There is provided a method for spreading notifications pertaining to the completion of file transfers in time. The method is based on the concept of imposing different delay times on different devices, which delay times must be observed prior to notifying the server of a file transfer completion.

13 Claims, 4 Drawing Sheets

(51) Int. Cl.
- *G06F 3/00* (2006.01)
- *G06F 9/44* (2006.01)
- *G06F 9/445* (2006.01)
- *G06F 15/173* (2006.01)
- *G06F 15/16* (2006.01)
- *H04L 12/24* (2006.01)
- *H04N 21/435* (2011.01)
- *H04N 21/81* (2011.01)
- *G06F 3/0481* (2013.01)
- *H04L 29/08* (2006.01)
- *H04L 29/06* (2006.01)
- *H04L 12/801* (2013.01)
- *H04L 12/26* (2006.01)

(52) U.S. Cl.
CPC .......... *H04N21/8166* (2013.01); *G06F 3/0481* (2013.01); *H04L 29/08072* (2013.01); *H04L 29/06* (2013.01); *G06F 9/4443* (2013.01); *G06F 8/65* (2013.01); *G06F 8/67* (2013.01); *G06F 9/4411* (2013.01); *H04L 29/08981* (2013.01); *H04L 47/10* (2013.01); *G06F 8/61* (2013.01); *H04L 41/0213* (2013.01); *H04L 43/0858* (2013.01); *H04L 67/06* (2013.01); *H04L 67/1029* (2013.01); *H04L 67/325* (2013.01)
USPC ........... 725/132; 725/152; 725/116; 725/140; 725/146; 715/748; 715/749; 717/171; 717/173; 717/176; 717/178; 709/235; 709/244; 709/223; 709/224; 709/232

(56) References Cited

U.S. PATENT DOCUMENTS

| | | | |
|---|---|---|---|
| 7,706,299 B2* | 4/2010 | Chang et al. | 370/253 |
| 7,843,956 B2* | 11/2010 | Yamada et al. | 370/447 |
| 2006/0015618 A1 | 1/2006 | Freimuth et al. | |
| 2006/0019638 A1 | 1/2006 | Chiu et al. | |
| 2007/0005647 A1 | 1/2007 | Cugi et al. | |
| 2007/0105533 A1 | 5/2007 | Chiu et al. | |
| 2008/0170589 A1* | 7/2008 | Yim et al. | 370/468 |
| 2011/0252087 A1* | 10/2011 | Zuzga et al. | 709/203 |
| 2012/0079514 A1* | 3/2012 | Riedl et al. | 725/5 |
| 2012/0251071 A1* | 10/2012 | Oishi et al. | 386/230 |

FOREIGN PATENT DOCUMENTS

| | | |
|---|---|---|
| JP | 2008042757 A | 2/2008 |
| WO | WO-2009063762 A1 | 5/2009 |

OTHER PUBLICATIONS

Japanese Office Action dated Mar. 25, 2014 in corresponding Application No. 2012-535732.

* cited by examiner

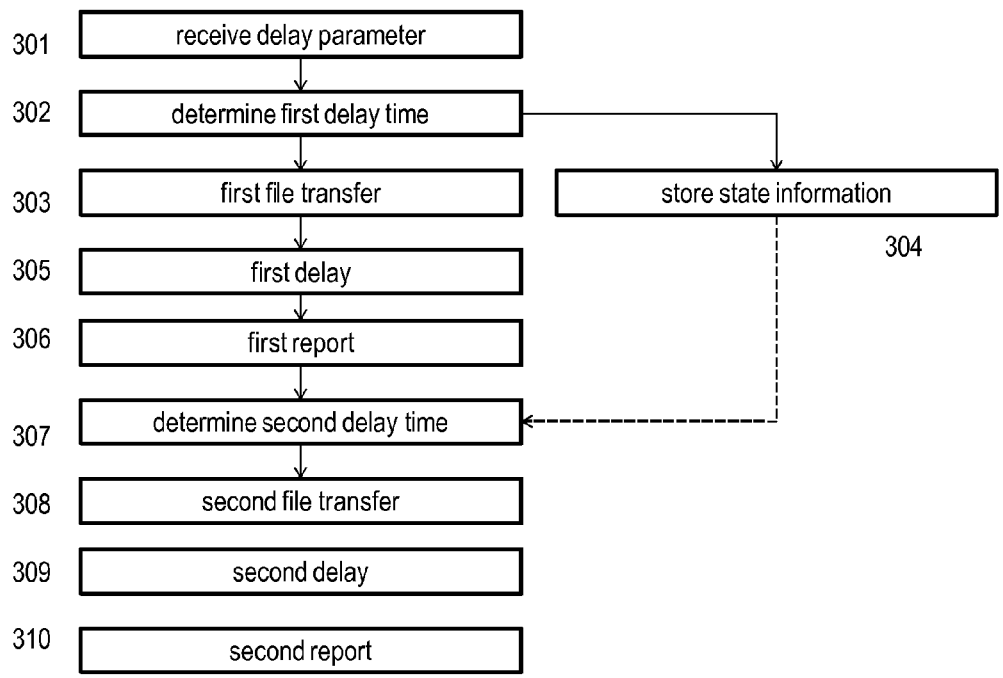
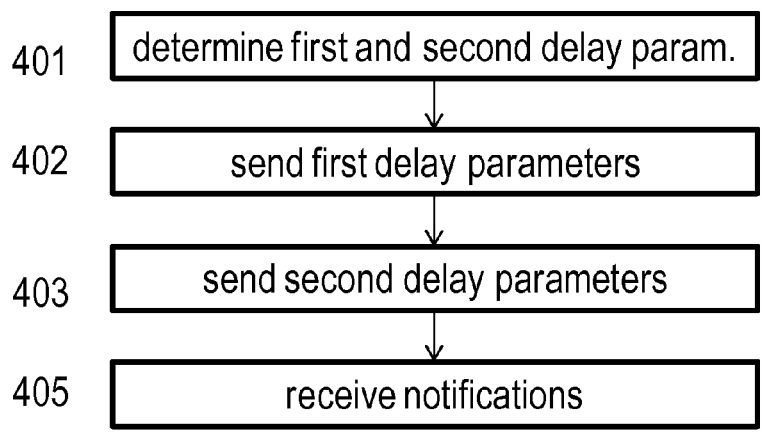

METHOD, APPARATUS, AND SERVER FOR SPREADING FILE TRANSFER NOTIFICATIONS IN TIME

FIELD OF THE INVENTION

The present invention relates to home devices such as set-top boxes, and more particularly to methods providing autonomous file transfers to and from such home devices.

BACKGROUND

In home devices such as those complying with the TR-069 standard, a capability to autonomously upload or download files is commonly provided. Such a file upload or download may be initiated by the home device without intervention from the Auto Configuration Server (ACS). It has been noted that it may be desirable to keep the ACS informed of such uploads and downloads. A known method to inform the ACS, which has been proposed in TR-069 Amendment 2, comprises sending an "Autonomous Transfer Complete" (ATC) message from the home device to the ACS upon completion of an autonomous file upload or download.

SUMMARY

It is an object of embodiments of the present invention to provide a method to reliably inform the ACS of the result of autonomous uploads and downloads without overloading the ACS, even when large numbers of home devices complete uploads and/or downloads at substantially the same time.

According to an aspect of the invention, there is provided a method for spreading notifications pertaining to the completion of file transfers in time, comprising the steps of receiving at a device at least one delay parameter from a server; determining a first delay time from said at least one delay parameter; initiating a first file transfer between said device and a correspondent; and upon completion of said first file transfer, reporting said first file transfer to said server, wherein said reporting of said first file transfer comprises waiting during said first delay time and then transmitting a first message to said server.

In an embodiment of the method of the present invention, said at least one delay parameter comprises a fixed delay.

In another embodiment of the present invention, said at least one delay parameter comprises a delay interval and a randomization seed, and said determining comprises performing a pseudo-random number generation algorithm using said randomization seed.

In an embodiment of the present invention, the method further comprises storing state information upon said determining of said first delay time; determining a second delay time from said at least one delay parameter and said state information; initiating a second file transfer between said device and a correspondent; and upon completion of said second file transfer, reporting said second file transfer to said server, wherein said reporting of said second file transfer comprises waiting during said second delay time and then transmitting a second message to said server.

According to another aspect of the invention, there is provided a method for configuring a plurality of devices to spread notifications pertaining to the completion of a transfer of a file in time, comprising the steps of determining at least a first set of delay parameters and a second set of delay parameters, said first set and said second set being unequal; sending said first set of delay parameters to a first one of said plurality of devices; sending said second set of delay parameters to a second one of said plurality of devices; receiving notifications from one or both of said first one and said second one of said plurality of devices pertaining to a transfer of a file, said notifications being delayed according to the set of delay parameters sent to said one or both of said first one and said second one of said plurality of devices, respectively, wherein said first set and said second set are determined in such a way that said notifications are received at different times.

In an embodiment of the invention, said set of delay parameters comprises a fixed delay.

In another embodiment of the invention said set of delay parameters comprises a delay interval and a randomization seed.

According to another aspect of the present invention, there is provided an apparatus for exchanging files with a correspondent, said apparatus comprising a file transfer unit, a receiver adapted to receive a delay parameter, a delay determination unit adapted to determine a delay time from said delay parameter, and a notification message generator adapted to generate a notification message and transmit said notification message upon completion of a file transfer by said file transfer unit after waiting for said delay time.

In an embodiment, the apparatus of the present invention further comprises a memory adapted to store state information from said delay determination unit and to retrieve state information for said delay determination unit.

In an embodiment of the apparatus according to the invention, the delay determination unit comprises a random number generator.

In an embodiment, the apparatus of the present invention is comprised in a home device.

According to yet another aspect of the present invention, there is provided a server for configuring a plurality of devices to spread notifications pertaining to the completion of a transfer of a file in time, comprising a delay parameter determination unit adapted to determine delay parameters, a transmitter adapted to transmit different sets of delay parameters from said delay parameter determination unit to different ones of said plurality of devices, and a notification receiver adapted to receive notifications pertaining to file transfers from said different ones of said plurality of devices.

In an embodiment, the server of the present invention is comprised in an auto-configuration server.

It is advantage of embodiments of the invention that different devices may be configured with different delay parameters, thus ensuring that when simultaneous completion of file transfers occurs among these different devices, the resulting completion reports will be spread in time according to the variation in delay parameters.

BRIEF DESCRIPTION OF THE FIGURES

Some embodiments of apparatus and/or methods in accordance with embodiments of the present invention are now described, by way of example only, and with reference to the accompanying drawings, in which:

FIG. 3 illustrates a flow chart of a method according to the present invention, pertaining to the operations of the device;

FIG. 4 illustrates a flow chart of a method according to the present invention, pertaining to the operations of the server, such as an Auto Configuration Server (ACS);

DESCRIPTION OF EMBODIMENTS

Although the embodiments below are described with use of terminology that is typical for TR-069 deployments of an auto-configuration server and a set of home devices, the invention is not limited thereto. The methods, apparatus, and servers according to the invention may advantageously be used in exchanges according to other protocols, where similar notifications are desired.

It is considered useful to allow a server that does not take part in a particular file transfer, such as an ACS, to stay informed of the status of attempted file transfers by devices under its supervision or control. With respect to file downloads, this information allows the ACS for example to run additional actions for those devices that have downloaded a particular software release, such as a new feature or a patch. With respect to failed transfers, the information allows the ACS to take the necessary steps to remove the cause of the failure, for example by correcting the uniform resource locator (URL) or the credentials used by the device in the failed transfer.

The invention is based on the insight that it may be expected that large numbers of home devices will be made aware of the availability of new files for downloading at substantially the same time, because they will be receiving messages about these files from the same source over a common communication infrastructure, such as a multicast channel. The invention is further based on the insight that in a properly designed network environment, the majority of these uploads or downloads will be successful, and that this would lead, under the known methods, to a flood of near-simultaneous "Autonomous Transfer Complete" messages towards the ACS, which may cause an overloading of the ACS.

According to the invention, overloading of the ACS may be advantageously prevented by introducing a variable delay between the completion of a file transfer and the transmission to the control server of a notification pertaining to the file transfer. The variable delay is chosen in a way that ensures with a reasonable probability that the control server's capacity for incoming notifications is not exceeded. Hence, it is not necessary that every single device employs a unique delay value, but rather that the expected number of simultaneous transmissions is reduced to a number that is acceptable for the control server.

It is an advantage of embodiments of the present invention that the temporal link between the moment at which the availability for download of a new file is announced, and the moment at which file transfer completion is reported to the control server, is loosened. Hence, in a situation in which a large number of devices receive the announcement of the availability of the file at the same time, start the downloading of the file at the same time, and complete the downloading of the file at the same time, it is no longer the case that they all report the completion at the same time.

Figure 1:
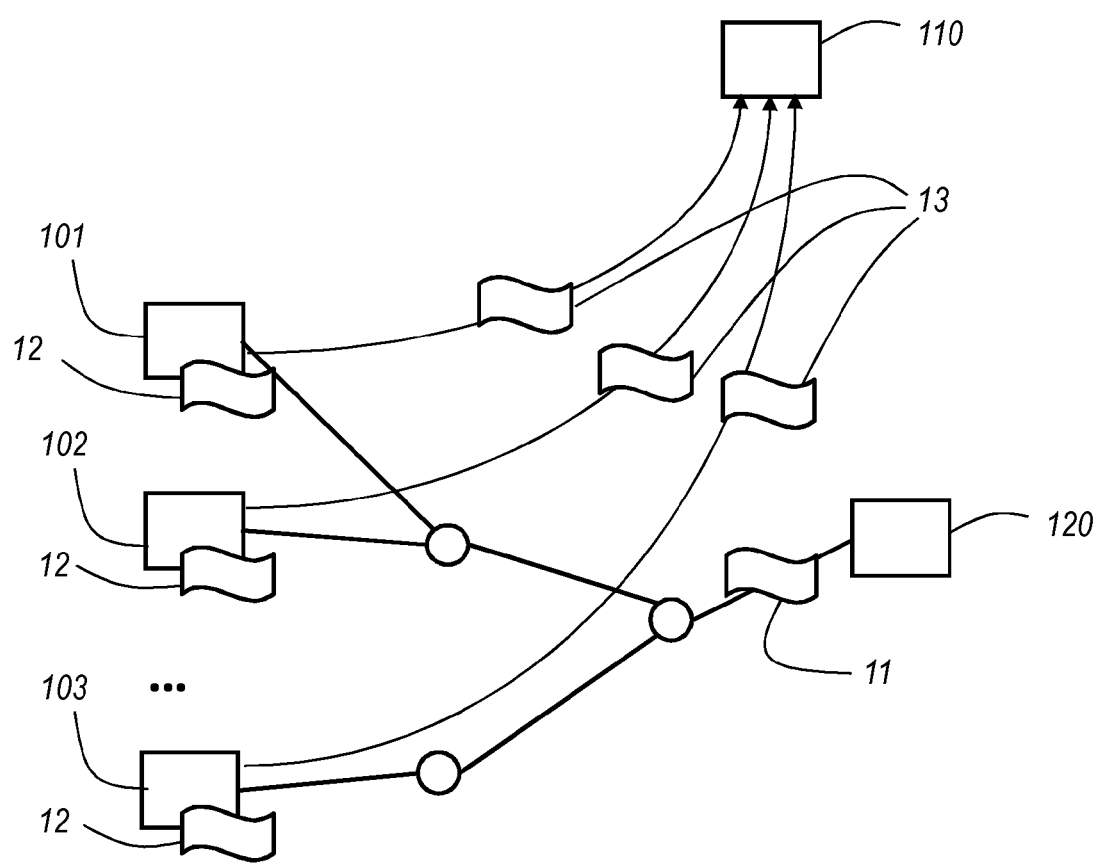
FIG. 1 schematically illustrates a network layout comprising an Auto Configuration Server (ACS), a file server, and a plurality of home devices, and steps performed according to the prior art.

FIG. 1 depicts a network layout comprising an Auto Configuration Server (ACS) 110, a file server 120, and a plurality of home devices 101, 102, 103, and steps performed according to the prior art. The devices 101, 102, 103 are made aware of the availability of a new file for download at file server 120 via an announcement 11 using known communication methods, such as multicast transmission. Upon receiving the announcement 11, the devices 101, 102, 103 start downloading 12 the newly available file. The downloading 12 may start substantially simultaneously at time T1 at the various devices 101, 102, 103. Assuming substantially identical transmission characteristics for the channels linking the respective devices 101, 102, 103 to the file server 120, a substantially simultaneous completion of the transmissions may be observed among the various devices 101, 102, 103 at time T2. The subsequent transmission 13 of messages from the various devices 101, 102, 103, reporting the completion of the transfer to the ACS 110 may overload the ACS 110.

Figure 2:
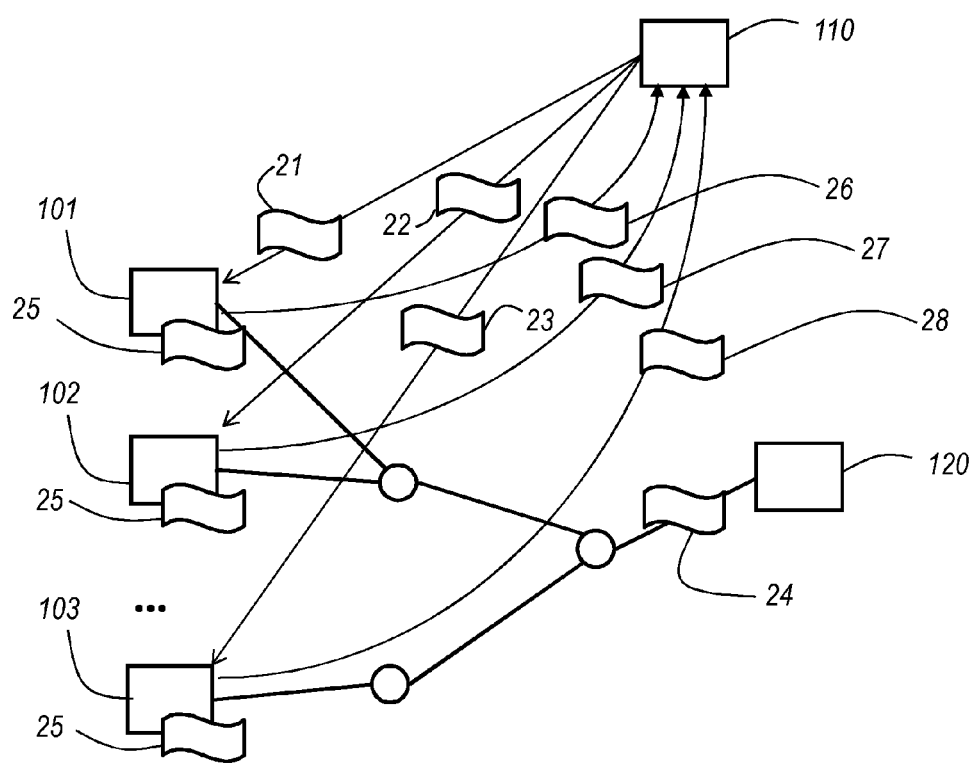
FIG. 2 schematically illustrates a network layout comprising an Auto Configuration Server (ACS), a file server, and a plurality of home devices, and steps performed according to an embodiment of the method of the present invention.

FIG. 2 depicts a network layout comprising an Auto Configuration Server (ACS) 110, a file server 120, and a plurality of home devices 101, 102, 103, and steps performed according to an embodiment of the present invention. In a set of preliminary steps 21, 22, 23, the control server 110 configures the devices 101, 102, 103 with respective delay parameters. The devices 101, 102, 103 are made aware of the availability of a new file for download at file server 120 via an announcement 24 using known communication methods, such as multicast transmission. Upon receiving the announcement 24, the devices 101, 102, 103 start downloading 25 the newly available file. The downloading 25 may start substantially simultaneously at time T1 at the various devices 101, 102, 103. Assuming substantially identical transmission characteristics for the channels linking the respective devices 101, 102, 103 to the file server 120, a substantially simultaneous completion of the transmissions may be observed among the various devices 101, 102, 103 at time T2. Each of the devices 101, 102, 103 will then wait for an amount of time derived from its at least one delay parameter. The subsequent transmission 26, 27, 28 of messages from the respective devices 101, 102, 103, reporting the completion of the transfer to the control server 110, occurs at $T1+\delta1$, $T1+\delta2$, and $T1+\delta3$, and are thus spread in time, avoiding an overloading of the control server 110.

The at least one delay parameter may comprise a fixed time delay to be observed by the particular device that is being configured. Alternatively, the at least one delay parameter may comprise a randomization seed and a delay interval, such that the device under configuration may calculate a new delay time within the delay interval for every transmitted report, by using a pseudo-random number generation algorithm seeded with the randomization seed.

In an embodiment, the delay observed by each device is a constant for all subsequent reports, as long as a given configuration is in force. In another embodiment, the delay observed by each device is calculated for every report, based on the delay parameters and state information such as a report counter or a value representing the delay observed for the previous report. The report counter may also serve as an indicator of the freshness of the delay parameters, for instance in a scheme wherein the device is adapted to request a new set of delay parameters when the present set has been used a predetermined number of times.

The underlying algorithms are now described in more detail with reference to FIG. 3 and FIG. 4.

An embodiment of the invention is represented in the flow chart of FIG. 3, where the steps shown concern actions to be taken on the side of the individual devices. Every device is initially configured with a received set of delay parameters 301. This set of parameters (which may comprise one or more variables), is used to derive a first delay time 302. Information about this derivation is stored as state information 304. At some later point, the device initiates a first file transfer 303.

The result of this file transfer is reported to the control server 306, but only after observing a delay 305 corresponding to the derived first delay time. A second delay time may now optionally be derived 307 for the second file transfer report, on the basis of the delay parameters and the state information. Alternatively, the second delay time is simply the same as the first delay time. At some later point, the device initiates a second file transfer 308. The result of this second file transfer is reported to the control server 310, but only after observing a delay 309 corresponding to the second delay time.

An embodiment of the invention is represented in the flow chart of FIG. 4, where the steps shown concern actions to be taken on the side of the control server. The control server determines different sets of delay parameters for different devices or groups of devices. In particular, the control server determines 401 a first and a second set of delay parameters for a first and a second device, respectively. The control server configures the first device by uploading the first set of delay parameters 402, and it configures the second device by uploading the second set of delay parameters 403. At a later point in time, the first and the second device having completed a file transfer substantially simultaneously, the control server will receive 404 notifications thereof from the devices at substantially different moments in time, due to the application of by the respective devices of a variable delay represented by the different received delay parameters.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Figure 5:
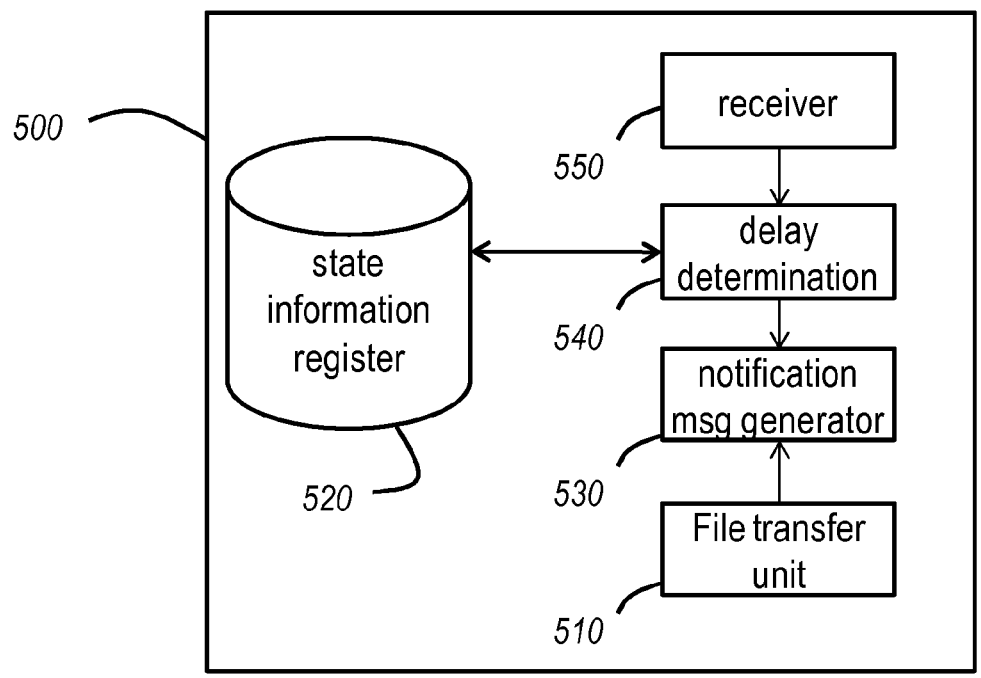
FIG. 5 schematically illustrates an apparatus according to the present invention.

The device 500 of the present invention is schematically illustrated in FIG. 5, whereby the different elements may correspond to individual hardware components, integrated hardware components, or software components running on a processor, in various combinations, as would be readily understood by the person skilled in the art. It will furthermore be appreciated that the network device 500 comprises means to transmit and receive messages on a network according to an appropriate protocol stack (not shown), and that the different elements of the device 500 have access to these means in the usual way to perform their functions. The file transfer unit 510 performs autonomous file transfers as described above. Upon completion of such a file transfer, the notification message generator 530 generates a notification message, which is only transmitted after a certain delay. The delay is determined by the delay determination unit 540, on the basis of a delay parameter received from a server by receiver 550, and optionally on the basis of state information stored in state information register 520. If state information is used, the state information register 520 is also updated by the delay determination unit 540.

Figure 6:
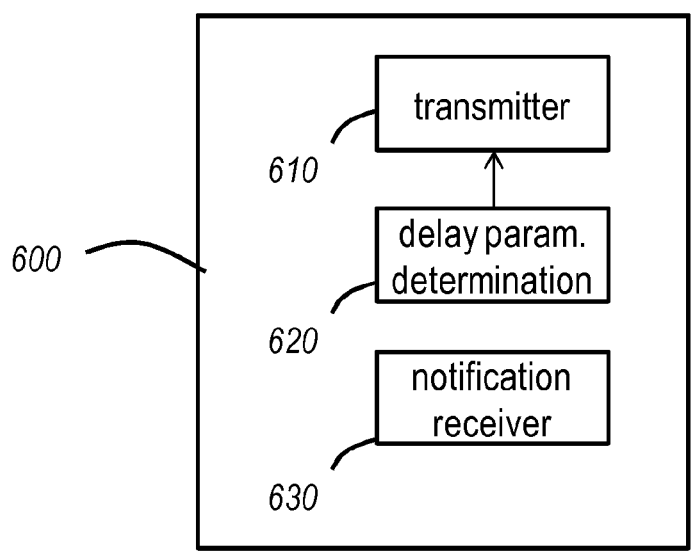
FIG. 6 schematically illustrates a server according to the present invention.

The server 600 of the present invention is schematically illustrated in FIG. 6, whereby the same assumptions govern the diagram as explained above for FIG. 5. The main responsibility of the server, for the purposes of the present invention, is to impose different delay parameters on different devices. To this end, the server 600 comprises a delay parameter determination unit 620, coupled to a transmitter 610 adapted to transmit the appropriate configuration messages. Once the devices in the network are operational, the server 600 receives their autonomous transfer completion messages, duly spread over time, through its notification receiver 630.

The invention claimed is:

1. A method for spreading notifications pertaining to the completion of file transfers in time, the method comprising:
   receiving at a device at least one delay parameter fixed by a server;
   determining at said device a first delay time from said at least one delay parameter by inputting the at least one delay parameter received from the server into a random number generation algorithm such that said first delay time is unique to said device;
   initiating a first file transfer between said device and a correspondent; and
   upon completion of said first file transfer,
      waiting during said first delay time, and
      upon expiration of said first delay time, transmitting, by said device, a first message to said server to report the completion of said first file transfer to said server.

2. The method of claim 1, wherein said at least one delay parameter includes a fixed delay.

3. The method of claim 1, wherein said at least one delay parameter includes a delay interval and a randomization seed, and said deter inning includes performing a pseudo-random number generation algorithm using said randomization seed.

4. The method of claim 1, further comprising:
   upon said determining of said first delay time, storing state information related to said determining of said first delay time;
   determining a second delay time from said at least one delay parameter and said state information;
   initiating a second file transfer between said device and a correspondent; and
   upon completion of said second file transfer,
      waiting during said second delay time, and
      upon expiration of said second delay time, reporting said second file transfer to said server by transmitting a second message to said server.

5. A method for configuring a plurality of devices to spread notifications pertaining to the completion of a transfer of a file in time, comprising:
   using at least a first set of delay parameters and a second set of delay parameters, said first set and said second set being unequal;
   sending said first set of delay parameters to a first one of said plurality of devices; and
   sending said second set of delay parameters to a second one of said plurality of devices;
   receiving notifications from one or both of said first one and said second one of said plurality of devices pertaining to a transfer of a file, said notifications being delayed according to the respective set of delay parameters sent to said one or both of said first one and said second one of said plurality of devices, respectively,
   wherein said first set and said second set are determined in such a way that said notifications are received at different times.

6. The method of claim 5, wherein said set of delay parameters includes a fixed delay.

7. The method of claim 5, wherein said first set and second set of delay parameters include a delay interval and a randomized seed.

8. An apparatus for exchanging files with a correspondent, said apparatus comprising:

a file transfer unit, a receiver adapted to receive a delay parameter from a server, a delay determination unit adapted to determine a delay time from said delay parameter, the delay time determined from said delay parameter by inputting the delay parameter received from the server into a random number generation algorithm such that said delay time is unique to said apparatus, and a notification message generator adapted to,
  generate a notification message, and
    transmit said notification message upon completion of a file transfer by said file transfer unit after waiting for said delay time.

9. The apparatus of claim 8, further comprising:

a memory adapted to store state information from said delay deteimination unit and to retrieve state information for said delay determination unit.

10. The apparatus of claim 8, wherein said delay determination unit comprises:

a random number generator configured to determine the delay time using the random number generation algorithm.

11. A home device comprising:

the apparatus of claim 8.

12. A server for configuring a plurality of devices to spread notifications pertaining to the completion of a transfer of a file in time, comprising:

a delay parameter determination unit adapted to determine delay parameters, a transmitter adapted to transmit different sets of delay parameters from said delay parameter determination unit to different ones of said plurality of devices, said plurality of devices inputting the different sets of delay parameters transmitted by the server into random number generation algorithms to generate unique delay times by said plurality of devices, and a notification receiver adapted to receive notifications pertaining to file transfers from said different ones of said plurality of devices.

13. An auto-configuration server comprising:

the server of claim 12.

* * * * *